FIG. 1

INVENTOR.
SAMUEL T. RUSSELL
BY Blair and Buckles
ATTORNEYS

Aug. 23, 1966  S. T. RUSSELL  3,268,299
APPARATUS FOR EFFECTING CHEMICAL REACTIONS
Original Filed Dec. 27, 1961  8 Sheets-Sheet 3

INVENTOR.
SAMUEL T. RUSSELL
BY *Blair and Buckles*
ATTORNEYS

United States Patent Office 3,268,299
Patented August 23, 1966

3,268,299
APPARATUS FOR EFFECTING CHEMICAL REACTIONS
Samuel T. Russell, Rye, N.Y., assignor to Crawford & Russell, Incorporated, Stamford, Conn.
Original application Dec. 27, 1961, Ser. No. 163,015. Divided and this application Jan. 30, 1964, Ser. No. 341,186
3 Claims. (Cl. 23—288)

This invention relates broadly to new and useful improvements in apparatus and methods for effecting catalytic reactions and is a continuation-in-part of my earlier application Serial No. 12,064, filed March 1, 1960, and now abandoned, and a divisional application of my co-pending application Serial No. 163,015 filed December 27, 1961. More particularly, it is concerned with improved reactors of the fixed-bed catalyst type and with improved methods for effecting catalytic, vapor-phase, exothermic reactions wherein the reactants in vapor state are brought into contact with a fixed-bed catalyst.

Reactors of the fixed-bed catalyst type are well-known. See, for example, Downs Patent No. 1,604,739 which describes apparatus for carrying out catalytic reaction wherein a fixed-bed catalyst is used, and for controlling the temperature of such reactions. Typical of the products made in such reactors, and in modified reactors of the kind with which this invention is concerned, are vinyl chloride prepared by bringing reactants consisting essentially of acetylene and hydrogen chloride in the vapor state into contact with a catalyst comprising mercuric chloride deposited on a carrier, specifically activated carbon; and vinyl acetate obtained by the vapor-phase reaction of reactants consisting essentially of acetylene and acetic acid in the presence of a suitable catalyst such as zinc acetate on activated carbon.

Other examples of reactions which are carried out in reactors of the kind referred to in the preceding paragraph, and which can be carried out in the apparatus of the present invention, are: oxidation reactions, e.g., the oxidation of naphthalene to phthalic anhydride, benzene to maleic anhydride, ethylene to ethylene oxide, etc.; halogenation and hydrohalogenation reactions, e.g., the conversion of benzene to chlorobenzene, acetylene to vinyl fluoride, methane to carbon tetrachloride, etc. Still other examples are the reduction of nitrobenzene to aniline, the chlorination of carbon monoxide to phosgene, the formation of dichlorodifluoromethane from chlorine and vinylidene fluoride, and the reaction between ammonia and an alcohol to make an amine, all of which reactions are commonly carried out in fixed-bed catalytic reactors.

With more particular reference to the production of vinyl chloride it may be stated that this monomer is conventionally prepared by the fixed-bed catalytic reaction of acetylene and hydrogen chloride in so-called "shell-and-tube" type reactors with catalyst in the tubes and coolant in the shell. The premixed reactants are fed directly to and through the catalyst in the tubes. The heat of reaction is conducted through the catalyst to the tube walls and then to the coolant flowing outside of the tubes.

In prior-art practices it has been found that the aforementioned "shell-and-tube" type reactors develop a restricted region of high temperature, a "hot spot," about 100° to 400° F. above the average reactor temperature in a region extending, especially with the first use of the catalyst, from a region about 6 to 10 inches or more from the feed inlet and extending over an axial distance of a few inches. The "hot spot" is caused by a rapid chemical reaction accompanied by a high heat release and the well-kown inability of a fixed-bed catalyst to transfer heat.

A "hot spot" is an undesirable feature of fixed-bed catalytic reactors since its presence reduces yields, lowers catalyst life, and makes difficult the control of the temperature of the reactor. Furthermore, the productive capacity of such reactors is limited by the heat-removal capacity at the "hot spot." In addition, there results the undesirable effect that the largest portion of the heat-transfer area is used to remove only a small portion of the heat liberated in the reaction.

The peak of the "hot spot" to which reference was made in the preceding paragraph is lowered as the catalyst "seasons" or "ages," that is, as more and more product is obtained from the reactants under the catalytic effect of the catalyst. The width of the "hot spot" increases until it extends, for example, as much as two-thirds of the length of the reaction tube. This may occur after, for instance, about 500 hours of operation of the reactor. With mercuric chloride deposited on a carrier as a catalyst, it is probable that mercuric chloride is partly vaporized in the "hot spot" and condenses on the relatively colder catalyst at the points beyond. In an attempt to obviate this difficulty some producers reverse the flow of the gaseous mixture of reactants with the thought that in this way the catalyst (mercuric chloride) will be redeposited at approximately the original location.

The initial concentration of mercuric chloride on the carrier is about 8 to 12% by weight of the catalytic mass (including the carrier). This amount of mercuric chloride may decrease to as little as, for instance, 3 to 5% by weight of the catalytic mass at the time when the catalyst is discarded. At the start-up of the operations there is an initial recycle of, for instance, about 10% (mostly hydrogen chloride) of the reactants charged. By the time the catalyst is discarded the amount of recycled feed stock increases to, for example, about 25% of the reactants charged. This means that the conversion per pass drops, in a typical case, from over 90% of the theoretical to less than 80%.

It is a primary object of the present invention to provide an improved reactor of the fixed-bed catalyst type and, more particularly, of the "shell-and-tube" type briefly described above and more fully in, for instance, the aforementioned Downs Patent and others, whereby the "hot spot" in the catalyst bed will be obviated or minimized.

It is a further object of the invention to provide an improved reactor of the kind briefly described in the preceding paragraph whereby the life of the catalyst will be prolonged; the throughput per reactor of given size of fixed-bed catalyst will be materially increased; and the average yield of product per pass during the useful life of the catalyst will not be lowered and may be increased.

Still another object of the invention is to provide an improved method of bringing one or all of the reactants initially into contact with the fixed-bed catalyst and whereby the aforesaid "hot spot" will be obviated or minimized and the other results mentioned in the preceding paragraph will be obtained.

A further object of the invention is to provide apparatus and methods of the above character wherein the reactants are introduced separately into the catalyst bed, with at least one of the reactants introduced at a multiplicity of points within the catalyst bed.

A further object of the invention is to provide methods and apparatus of the above character which provide an increased margin of safety in operation.

Another object of the invention is to provide methods and apparatus of the above character which when placed in series provide increased rates of production.

Other objects of the invention will be apparent to those skilled in the art from the following more detailed description and the accompanying drawing.

The novel features that are characteristic of my invention are set forth in the appended claims. The invention itself, however, will best be understood from reference to the more detailed description that follows, especially when considered in connection with the accompanying drawing which is illustrative of a preferred embodiment of the invention and wherein:

The invention includes a reactor of the fixed-bed catalyst type wherein new and improved means including an elongated, perforated, feed-gas distributor are provided for introducing one or more of the reaction components into the catalyst bed. More particularly, the methods of the invention involve bringing the reactants, in vapor state, into contact with the catalyst at a multiplicity of points, more particularly spaced points, within the catalyst bed. In other words, one or more of the reactants are brought into contact with the catalyst at a multiplicity, e.g., from 2 to 100 or more, of points within the catalyst bed; or, the number of the aforementioned points may be almost countless, for instance in the thousands, if the feed-gas distributor is formed in whole or in part of a porous material. Other embodiments of the invention include the partial premixing of some of the reactants and series reactors for more efficient production.

Figure 1:
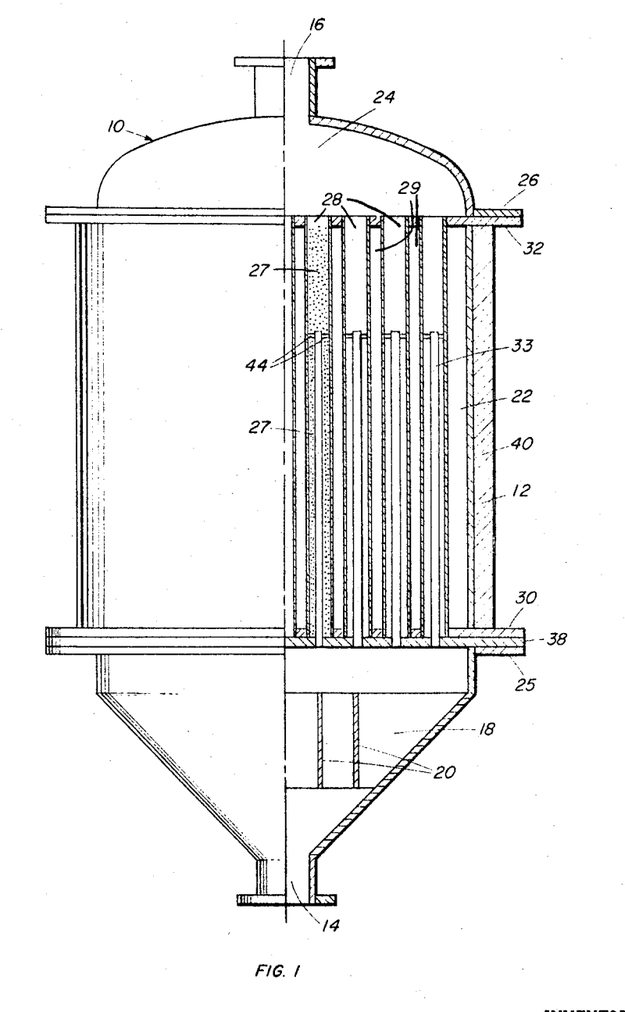
FIG. 1 is a view partly in elevation and partly in vertical section of apparatus embodying my invention.

Referring to the drawings and more particularly to FIG. 1 thereof, there is shown by way of illustration a reactor 10 of the fixed-bed catalyst type and, still more particularly, of the "shell-and-tube" type. In this figure the main chamber, indicated at 12, is provided with an inlet 14 for the mixture of gases to be reacted, e.g., a mixture of acetylene and hydrogen chloride, and an outlet 16 for the gaseous products of reaction. A plurality of inlet and outlet openings may be provided as desired or as conditions may require.

Figure 8:
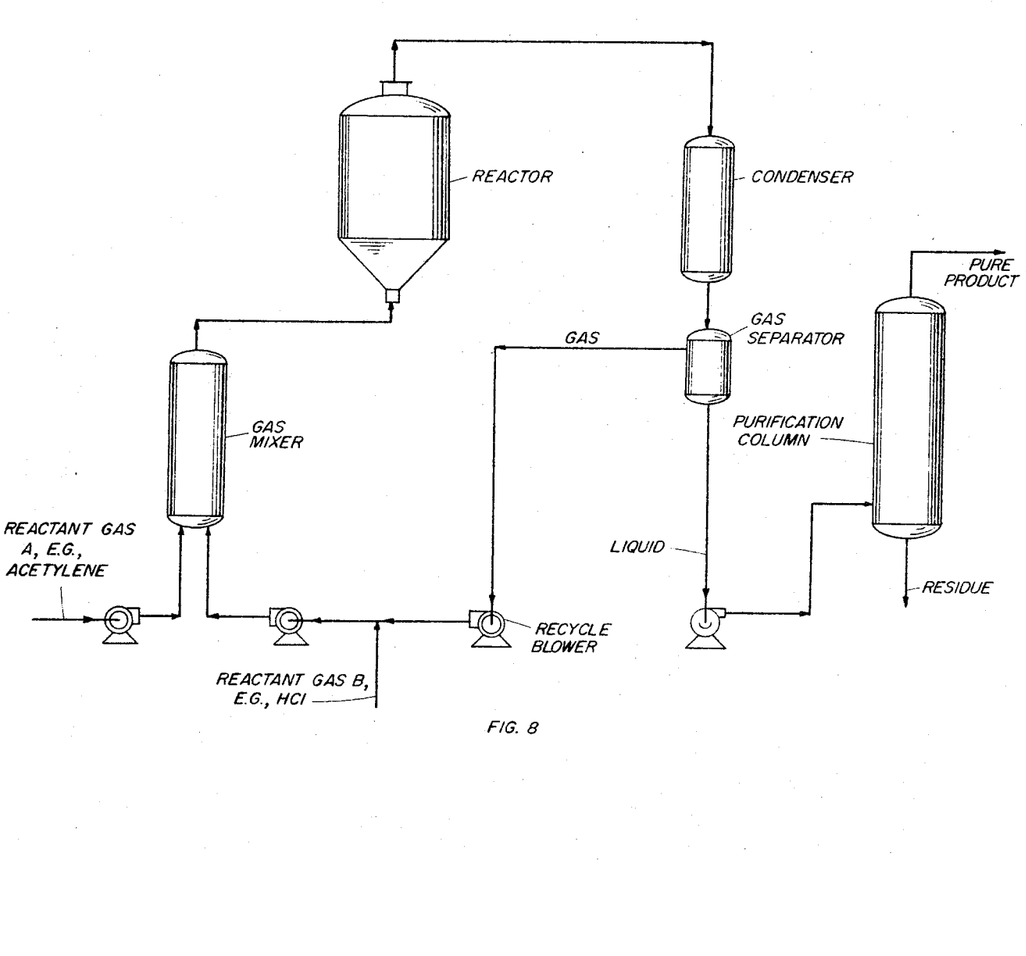
FIG. 8 is a flow sheet showing schematically the use of the improved reactor of this invention in a typical process.
Figure 12:
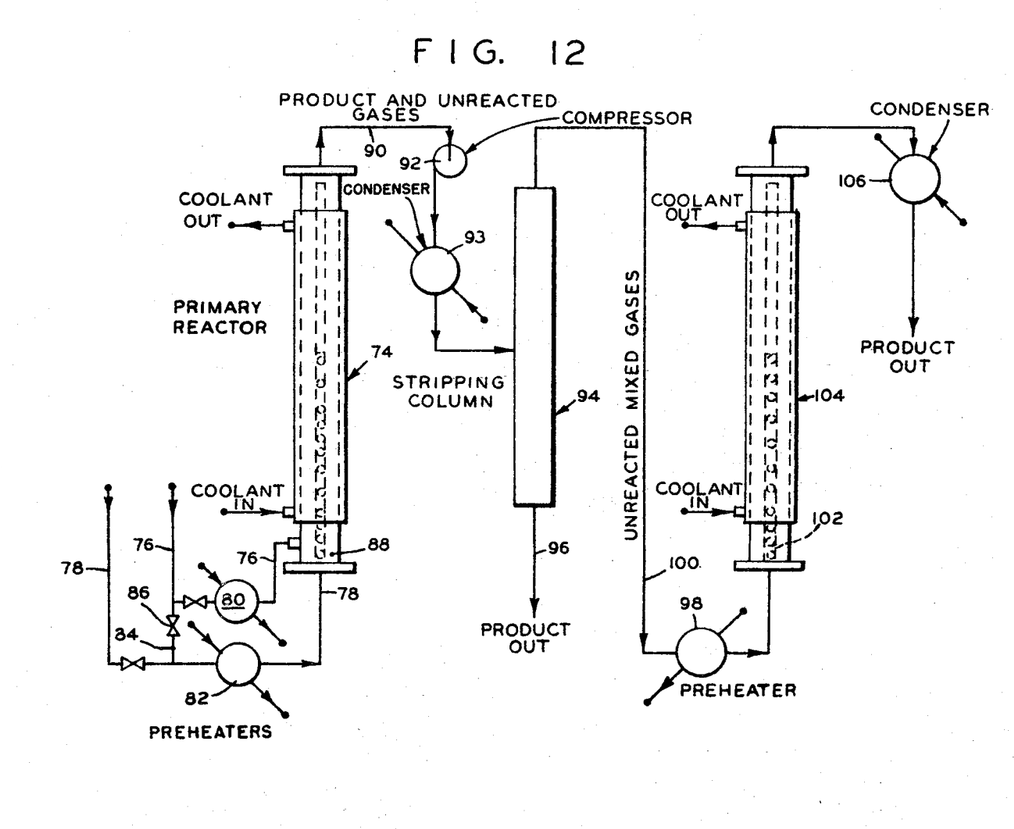
FIG. 12 is a flow sheet showing schematically processes and apparatus of embodiments of the invention.

Any suitable technique can be used in producing the mixture of gases or vapors to be reacted. The gaseous mixture contains the gases in the proper proportions to provide the optimum mixture for the particular reaction. After leaving the reactor through the outlet 16 the products of reaction are led to suitable means, e.g., a condenser, for cooling and recovering the reaction product or products. Unreacted gases can be separated, as indicated in the flow sheet shown in FIG. 8, and recycled to the reactor 10 for further reaction, but are preferably passed to a secondary reactor as shown in FIG. 12.

Referring to FIGURE 1, the main chamber 12 is provided with a lower compartment or space 18 in which the entering gases can spread out and in which are located a plurality of straightening vanes or baffles such as those indicated at 20. A central compartment or space 22 contains the catalyst as will be described hereafter. An upper compartment or space 24 receives the gaseous reaction products on their way from the reaction zone to the outlet 16.

The main chamber 12 is attached to the lower compartment 18 and to the upper compartment 24 by bolts which pass through bolt holes in the flanges or plates 25 and 30, and 26 and 32. The lower tube sheet 38 is held firmly between the flanges 25 and 30 by the pressure from the bolts. Leakage between the tube sheets is prevented by suitable gasketing between the flanges.

In the construction illustrated in FIG. 1 the catalyst 27 is contained in a number of catalyst tubes 28, which may have any cross sectional shape and may have fins or other surface extensions for greater heat-transfer capacity. These catalyst tubes are suitably spaced apart and removably or fixedly attached to the flanges 30 and 32. These flanges or plates serve to hold the tubes 28 in position.

Within each of the tubes 28 an elongated, perforated, feed-gas distributor 33 extends longitudinally a substantial distance within the tube. Thus, the distributor 33 may extend only a relatively small fraction, e.g., about 5% of the distance within the catalyst tube 28, or it may extend the total length of the said tube, i.e., 100%. The distributor 33 is preferably closed at its forward end 34 (FIG. 2) but, if desired or conditions indicate it to be advantageous, the forward end also may be provided with one or more openings therein.

As has been indicated hereinbefore, each feed-gas distributor 33 has a multiplicity of openings 36 (FIG. 2) in the side walls thereof. The number of these openings and the manner and distance of their spacing from each other cannot be stated with exactness. However, in general, it may be said that the total area of the spaced openings is approximately 0.002% to 30% of the total area of the side walls of the feed-gas distributor including the openings.

Figure 4:
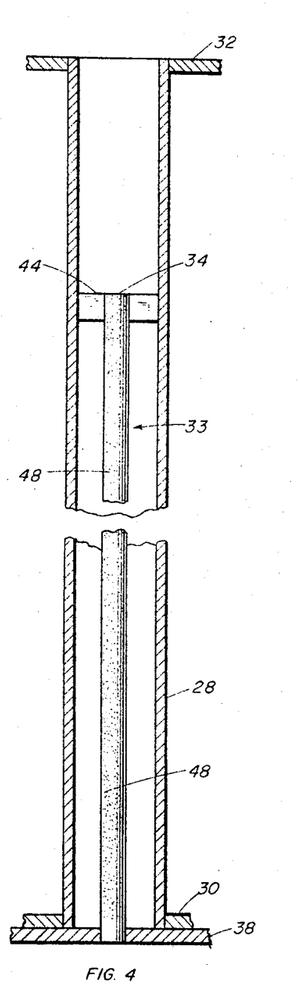
FIGS. 4, 5, 6 and 7 are vertical, sectional, broken views of catalyst tubes which contain alternative forms of feed-gas distributors therein.
Figure 5:
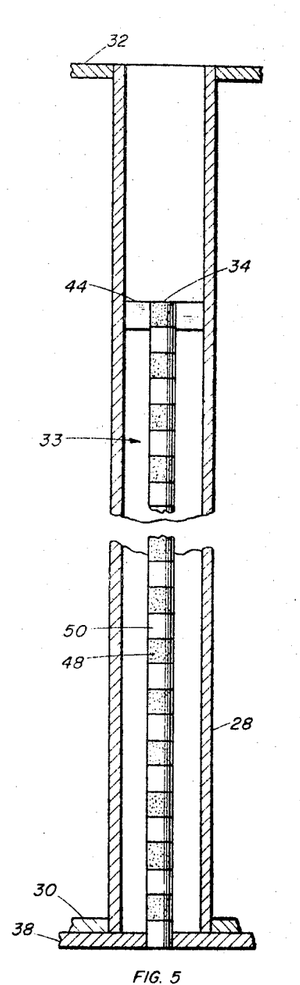
Figure 6:
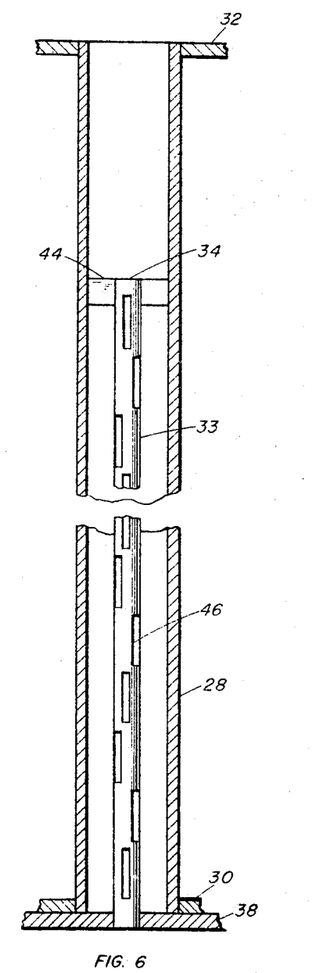

It will be noted from FIGS. 2, 4, 5, 6, and 7 that the openings in the feed-gas distributor may take a variety of forms. (In these figures the same parts or materials are designated in each figure by the same number.) Thus, the side walls of the distributor may have a series of spaced openings therein arranged in accordance with a predetermined geometrical pattern. The openings may be spaced circular openings 36 (FIG. 2) or they may be spaced longitudinal slots 46 (FIG. 6). Such circular openings or longitudinal slots may be either uniformly or irregularly spaced apart as desired or as conditions may require. The openings may be evenly spaced on all sides; or evenly spaced but each opening rotated 90° from the preceding one; or with the openings spaced more closely at one end than at the other.

As shown in FIG. 4, wherein the feed-gas distributor is designated generally as 33, the openings may be those which are inherently present in a porous material 48. The porous material may take the form of, for example, a porous metal, e.g., a powdered, sintered metal such as an iron-nickel alloy, or a porous ceramic material, e.g., Alundum.

FIG. 4 illustrates a modification wherein the feed-gas distributor is made of (that is, it is composed or consists essentially of) porous material throughout at least the side areas thereof. FIG. 5 illustrates a modification wherein the feed-gas distributor (also designated generally in this figure as 33) is comprised of alternate bands of porous material 48 and of impervious material 50. The latter may be any heat-resistant, substantially non-porous substance, e.g., impervious metal. Each of the aforesaid bands extends at least part (e.g., up to 100%) of the distance around the circumference of the distributor.

Figure 7:
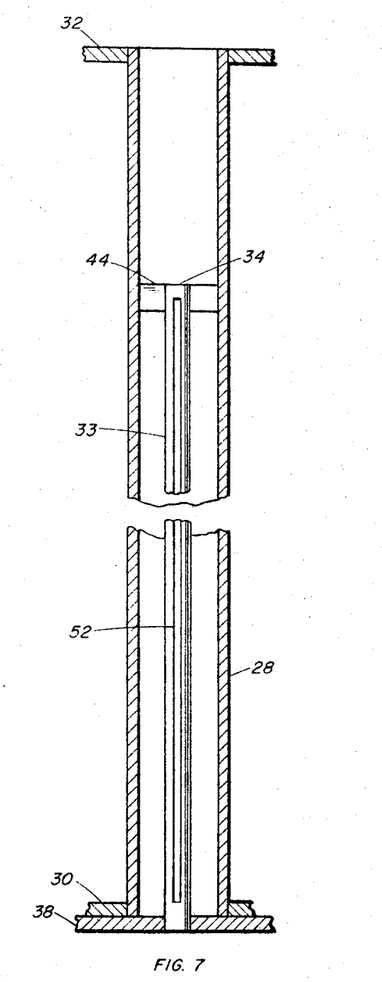

The feed-gas distributor may be provided with a single longitudinal slot extending either substantially all or only part of the length of the distributor. Such a modification is illustrated in FIG. 7 wherein a slot 52 is shown as extending substantially the full length of the distributor. If desired or required for the particular use of the apparatus, a second, similar, narrow, slot-like opening may be provided on the opposite side from the first longitudinal slot; or several such slots may be suitably arranged in the side areas of the feed-gas distributor.

As will be understood by those skilled in the art, a variety of combinations of the modifications of the openings in the feed-gas distributors shown in FIGS. 2, 4, 5, 6, and 7 can be made; and any and all such combinations, as well as others, are within the scope of the present invention.

The feed-gas distributors 33 are removably attached, as by screw threads, or fixedly attached, as by welding, to the lower tube sheet or plate 30. These feed-gas distributors or distributor tubes attached to plate 38 are arranged in such a way that they are positioned within and along the center lines of catalyst tubes 28 by means of radial spacers 44. However, the feed-gas distributors are not attached at the upper end. This arrangement makes it possible to quickly and readily remove the entire assembly of feed-gas distributors and support from the reactor when desired or conditions require. It also makes possible the charging or loading of the catalyst into the tubes from above when the upper part of the reactor that forms the upper compartment 24 has been removed.

Each feed-gas distributor extends a substantial distance into each catalyst tube 28. This distance may vary over a wide range, but usually is at least about 5% of the length of the catalyst tube and may be within the range of from about 5% to 100% of the length of the catalyst tube, depending upon the particular conditions required in the particular catalytic reaction that is being carried out. Ordinarily, however, the distributor will extend within the catalyst tube (especially in reactions such as those exemplified by the reaction between acetylene and hydrogen chloride in vapor state, using mercuric chloride on a carrier as a catalyst) a longitudinal distance of at least about 5% and not more than about 75 or 80% of that portion of the length of the catalyst tube 28 which is adapted to receive catalyst therein.

A suitable heat-insulating jacket 40 is provided for prevention of heat loss and/or for protection of personnel.

The space 29 around the catalyst tubes 28 forms a continuous temperature-regulating system for containing a temperature-regulating fluid which is circulated into and out of the system through suitable inlet and outlet openings (not shown). For additional information on this phase see the aforementioned Downs Patent No. 1,604,739.

The catalyst tubes 28 are filled with the catalyst 27 to a suitable height. In operation the temperature-regulating fluid, e.g., oil, water or molten salt, is supplied to the temperature-regulating system to a depth slightly more than the depth of the catalyst. Consequently the catalyst in the tubes 28 is surrounded on all sides by the fluid surrounding the tubes.

In operation the reactant gases are ordinarily premixed and then charged to the reactor 10 through the inlet 14 and the lower compartment of chamber 18. The baffles or straightening vanes 20 help to distribute the gases evenly over the area of the reactor. The gases pass upwardly into the distributor tubes (feed-gas distributors) 33. The pressure drop across the openings in the walls of the tubes is large in comparison to the pressure drop in the vertical direction so that the flow is the same through each of the openings 36 in the wall of each of the tubes 33.

The gases pass through the openings in the wall of the tubes and into the mass of catalyst 27 where the reaction takes place. The unreacted gases and products flow vertically up the tube and out of the reactor through the outlet or exit 16. By admitting the gases in numerous small streams spaced longitudinally, the reaction is caused to take place along the length of the column rather than in a small section near the feed inlet. As a consequence the intensity of the reaction is reduced and the temperature rise is lowered. The greater part of the reaction takes place near the gas inlets and the remainder as the gas passes up the tube. In the upper portions the reaction rate is greatly reduced and there is no difficulty in controlling the temperature of the reaction.

The heat of the reaction is taken away by water or other suitable coolant such as ethylene glycol, and the eutectic mixture of diphenyl and diphenyl oxide (commercially available under the trademark Dowtherm), and other compounds and compositions that are commonly used as coolants. The coolant is circulated around the catalyst tubes in the space 29.

The temperature of the catalyst bed is substantially uniform along the length of the individual distributor tubes 33 and then declines toward the coolant temperature in the upper part of the bed, that is, in the region adjacent to, and above, the upper part of the tubes 33. The introduction of the tubes 33 into the catalyst tubes 28 in the manner provided by the present invention gives the unexpected reults hereinbefore described due to the better and more uniform control of the temperature in and throughout the catalyst bed. Such temperature control was not possible with the prior art apparatus and method of operation and wherein all of the reactants are introduced into the catalyst tube at one point.

Figures 9, 10:
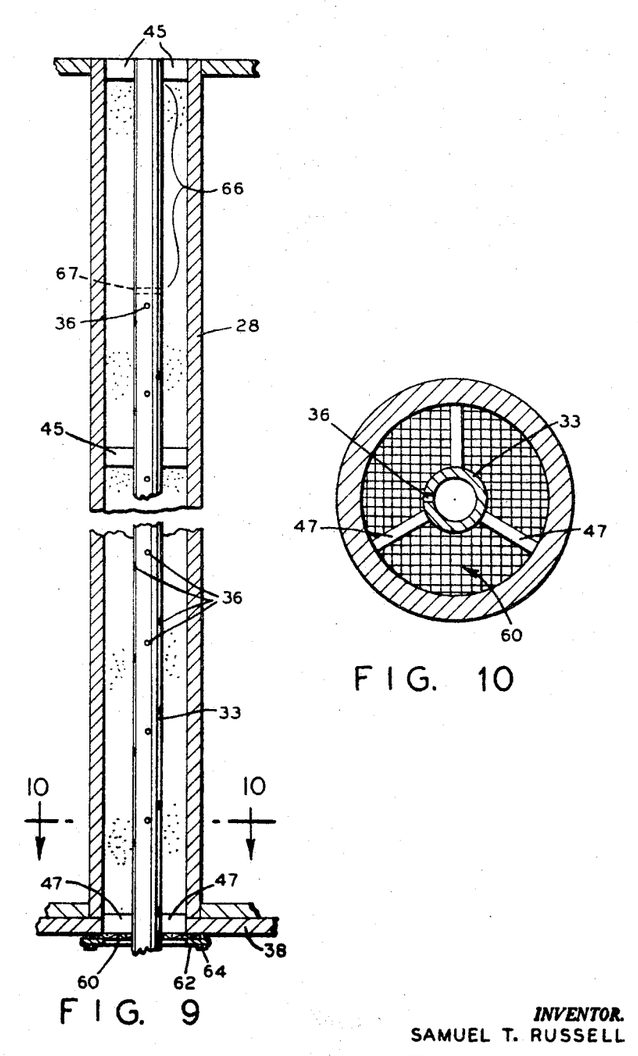
FIG. 9 is a vertical, sectional, broken view of a catalyst tube having means for separately introducing reactants to a catalyst in the tube.
FIG. 10 is a sectional view taken along lines 10—10 of FIG. 9.

The embodiment shown in FIGURES 9 and 10 has given results greatly superior to the conventional prior art methods of vinyl chloride production. In this embodiment a screen 60 is secured to the bottom of the catalyst tube or to plate 38 as shown by a retaining ring 62 and bolts 64. In this embodiment the central distributor tubes 33 of each catalyst tube are connected to a separate reactant source, while the other reactant is passed through screen 60 from the lower compartment or chamber 18 (FIG. 1). Thus, the reactants are kept separated and are not combined until they reach the openings 36 along the gas-distributor tube 33.

The distributor tube 33 also extends the full length of the catalyst tube 28 and the upper portion 66 of the distributor tube is impervious. A tube plug or closure 67 may be placed at any convenient location in portion 66 of the distributor tube beyond the last opening 36. This core extension 66 permits more uniform heat control of the reaction, since the catalyst will all be located closer to the tube wall 28, and no catalyst will be located in the central "core" portion of the reactor tube. In this embodiment radial spacers 45 and 47 may be used at the top and bottom of the gas distributor tube to center it within the catalyst tube 28.

With the embodiment shown in FIGURES 9 and 10 reactants may be introduced separately, and a number of advantages have been found in keeping the reactants separated until the reaction is to take place within the catalyst tube. One advantage is that the reactants may be preheated before they are delivered to the reactor tube, resulting in much higher yields. Preheating of mixed reactants results in premature reaction in a number of cases. The preheating of the reacting gases also tends to distribute the reaction more evenly throughout the catalyst tube.

In order that those skilled in the art may better understand how the present invention can be carried into effect, the following examples are given by way of illustration and not by way of limitation. All parts and percentages are by weight unless otherwise stated.

*Example 1*

Figure 2:
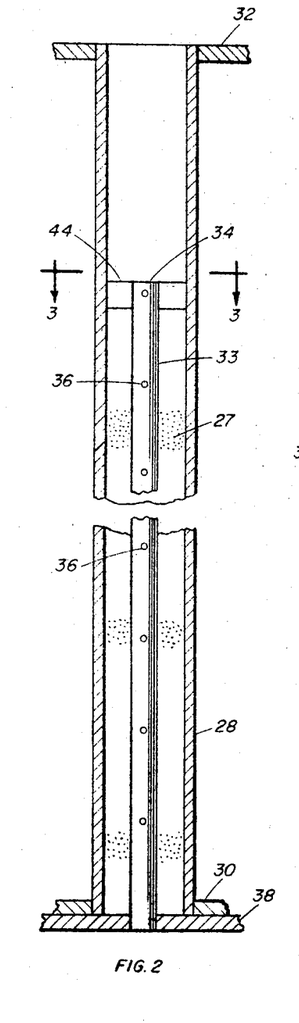
FIG. 2 is a vertical, sectional, broken view of one of the catalyst tubes shown in FIG. 1, which tube contains one form of feed-gas distributor therein.
Figure 3:
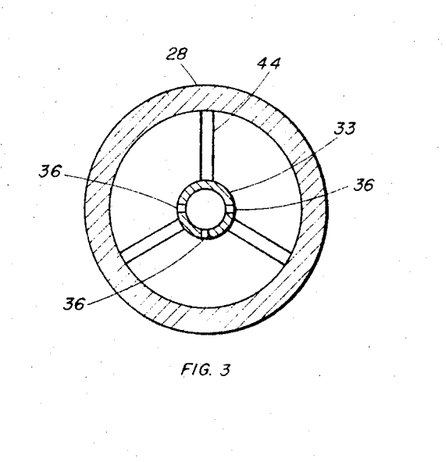
FIG. 3 is a sectional view taken along the line 3—3 of FIG. 2.

Vinyl chloride is made from acetylene and hydrogen chloride in a single catalytic tube containing a central distributor tube as shown in FIG. 2 of the accompanying drawing. The experimental apparatus consists of a 2-inch outside diameter 10 gauge carbon steel tube 10 feet long. This tube is jacketed along its entire length by a 3-inch schedule 40 IPS carbon steel pipe. Both the tube and pipe are welded between 6-inch flanges. The jacket contains suitable openings for the flow of coolant fluid. Along the center line of the 2-inch tube a 5/8-inch outside diameter 12 gauge carbon steel tube extends for a distance of 5 feet, that is, halfway up the 2-inch tube. The central gas distributor tube extends outside the flange a distance of approximately 6 inches and has suitable connection for the gas-inlet stream(s). This tube is closed at its upper end.

Approximately halfway between the outside wall of the inner tube and the inner wall of the 2-inch tube is a 3/16-inch outside diameter by 1/8-inch inside diameter tube closed at its upper end and welded to the bottom flange. This 3/16-inch tube serves as a thermocouple well. A single thermocouple is moved up and down from the open lower end, and therefore, can measure the temperature at any point in the bed.

The reactant gases are supplied from cylinders and are passed through several washing operations to remove impurities such as water, phosphine and arsine, and acetone before reaching the reactor. The rate of flow of the gases is individually controlled by manual operation of throttling valves and metered by gas rotameters. The gases are mixed by passage through a 2-inch diameter, 3-ft.-pipe packed with 1/4-inch Raschig rings.

The vinyl chloride leaving the reactor is cooled and collected by liquefaction in a condenser cooled by solid carbon dioxide. The unreacted gases are vented to a ventilating system.

The catalyst comprises activated carbon carrying mercuric chloride and is of irregular shape, approximately 1/8-inch in diameter. The catalyst particles are dropped into the annular space between the distributor tube and the wall of the reactor tube in a careful way so as to get uniform distribution of the flowing gas. The entire height of 10 feet is packed with catalyst.

In carrying out the tests the reactor is assembled without the central distributor tube. The reaction tube is packed to a depth of 10 feet with a standard catalyst of approximately 1/8-inch diameter. Acetylene and hydrogen chloride are passed from cylinder through washing bottles containing various materials used to remove impurities. The acetylene is passed through water, solid calcium chloride and an activated alumina column for final moisture removal. The hydrogen chloride is passed through calcium chloride.

The acetylene flows continuously at a rate of 3 standard cubic feet per hour measured at 760 mm. Hg pressure and 0° C., and the hydrogen chloride at 3.8 standard cubic feet per hour measured at 760 mm. Hg pressure and 0° C. These rates are equivalent to about 50 pounds per hour per square foot. The coolant used is the aforementioned eutectic mixture of diphenyl and diphenyl oxide. It is circulated from an insulated surge tank through a rotameter and thence through the jacket. The coolant is maintained at an average temperature of 200° F.

Soon after the reactant gases start through the bed a "hot spot" develops about 6 inches from the entrance of the tube and extends for a distance of about 3 inches. This "hot spot" has a temperature of about 460° F.

The conversion of the reactants is almost 100% and the yield of vinyl chloride is about 95%.

The foregoing test shows conclusively that by the prior art apparatus and method techniques, the objectionable "hot spot" is obtained, using a reactor of the "shell-and-tube" type in producing vinyl chloride from acetylene and hydrogen chloride.

Another test is then carried out in accordance with the present invention, as follows:

The central distributor tube is inserted in the apparatus and the same kind of catalyst used in the previous test is packed into the annular space. The central distributor tube has 30 holes, less than 1/8-inch in diameter, spaced every 2 inches, and every hole rotated 90° from the preceding one.

The acetylene and hydrogen chloride flow at the same rates as in the previous test, but in this test the mixture of acetylene and hydrogen chloride passes up the central distributor tube. In this case the catalyst-bed temperature does not exhibit any "hot spot" but, in marked contrast, is substantially uniform over the first five feet of the bed. The bed temperature is approximately 250° F., and this temperature extends about 7 feet into the reactor and then drops sharply toward the temperature of the coolant, viz. 200° F.

The conversion of the reactants is almost 100% and the yield of vinyl chloride is essentially the same as that obtained in the first test, more particularly about 95%.

*Example II*

The apparatus of Example I is assembled with the central distributor tube installed and a different type of catalyst. In this case the catalyst is zinc acetate deposited on a commercially available form of carbon, e.g., activated carbon. The zinc acetate constitutes about 10% by weight of the acetate plus carriers may be employed, e.g., coke.

Vapors of acetylene and acetic acid are mixed in the proportions of 1.5 cubic feet per hour of acetic acid and 4.6 cubic feet per hour of acetylene. These are passed into the central distributor tube and thence into the catalyst mass. The acetic acid is almost completely converted to vinyl acetate, and the acetylene is vented. In an industrial plant the unreacted acetylene would be recycled.

The temperature of the catalyst bed is substantially uniform at about 390° F. over the length of the distributor tube, and there is no evidence of the development of any "hot spot," with its known disadvantages, at any point in the bed of the catalyst.

The following example illustrates the advantages of the embodiment shown in FIGURES 9 and 10.

*Example III*

A ten foot reaction tube similar to the one used in Example I containing mercuric chloride on carbon granules as a catalyst is used for the production of vinyl chloride monomer. Hydrogen chloride is passed through the distributor tube at a rate of 4.36 lb./hr. and acetylene is passed through screen 60 at the bottom of the reaction tube at the rate of 3.32 pounds per hour. Both the hydrogen chloride and acetylene are pre-heated to an average temperature of 180° F. The percentage of conversion is 99.2% and vinyl chloride is produced at the rate of 7.39 pounds per hour.

Figure 11:
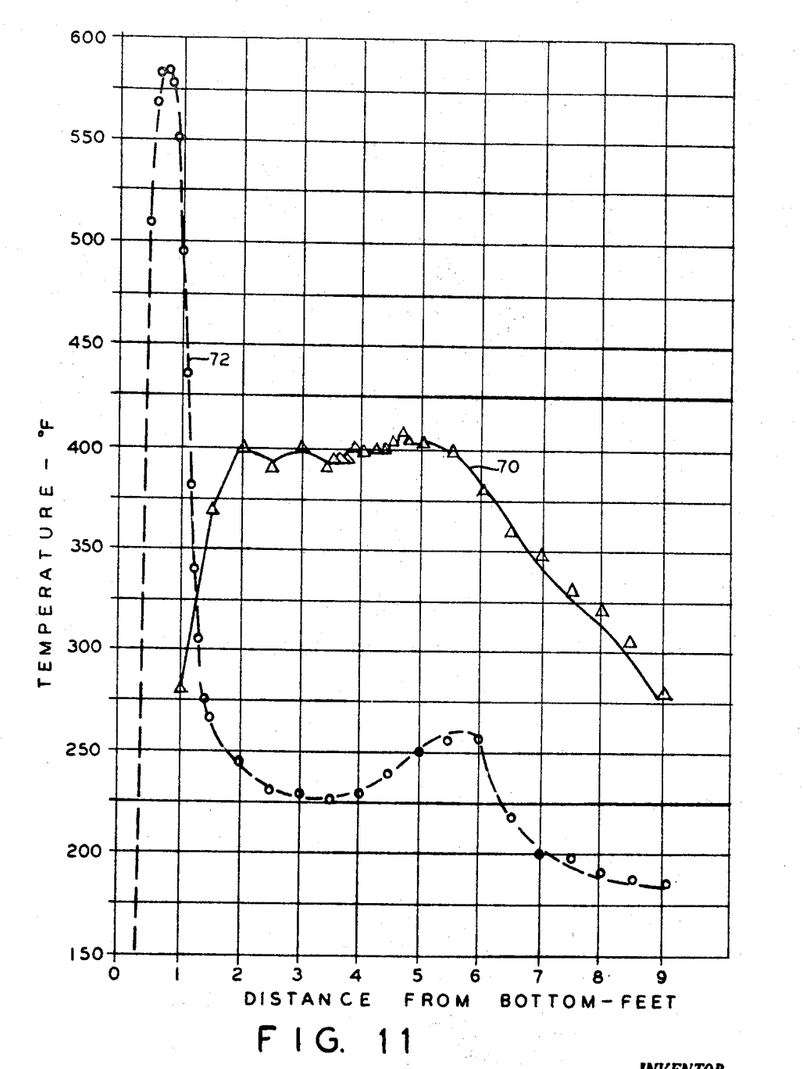
FIG. 11 is a graph of typical curves illustrating temperatures at points along the catalyst tube for a prior art method of effecting the reaction, as compared to similar temperatures with the method under one embodiment of the invention.

Temperature readings at various points in the reaction tube are taken and are illustrated by curve 70 in the graph of FIGURE 11, with temperature plotted against distance from the bottom of the catalyst tube.

When vinyl chloride is produced without preheating of the reactants by conventional prior art methods i.e., both reactants being introduced at the bottom of the catalyst tube, a production rate of 1.05 pounds per hour of vinyl chloride results. Temperatures at various points along the reaction tube for this "conventional" method are also plotted in FIGURE 11 as curve 72.

It will be noted that the maximum catalyst bed temperature under the "conventional" method reached 585° F. These high temperatures were experienced in the first foot of the reaction tube, while in the test employing the instant invention the maximum catalyst bed temperature was only 409° F. It should also be noted that an even temperature in the neighborhood of 400° F. was recorded almost uniformly at distances of from 2 feet to 6 feet along the catalyst tube. Thus the reaction was spread longitudinally throughout the catalyst and was not localized at any one spot along the catalyst tube.

With the even distribution of the reaction throughout a substantial length of the reaction tube the heat of reaction is much easier to control by the cooling medium around the reaction tube. Production was increased markedly and deterioration of the catalyst minimized in the test in accordance with the invention.

With the conventional method the "hot spot" resulted in considerable deterioration of the catalyst, since the melting point of mercuric-chloride is 530° F. Breakdown of the catalyst is kept at a minimum with my invention and the production rate can be greatly increased over conventional methods while eliminating the danger of a "hot spot" at any point in the reaction tube.

As will be noted in the graph of FIGURE 11 the optimum reaction temperature is spread over a substantial distance of catalyst with the reaction tube of my invention. In the example from which curve 70 has been plotted, it will also be noted that in the first two feet of the reactor tube the temperature had not yet reached the desired optimum of approximately 400°. In order to better utilize the catalyst in the initial portion of the reactor tube, I have found that preheating of the reactants provides the operating reaction temperature as closely as possible to the beginning of the catalyst bed.

In the preheating of certain reactants, such as acetylene, there are certain hazards, as the acetylene becomes explosive under pressure, and heat applied to the acetylene adds to the danger of the explosion. In order to provide an adequate margin of safety in the handling of such reactants under pressure, I have found that premixing of a portion of one reactant with the more dangerous reactant provides the desired safety factor. Thus in the production of vinyl chloride monomer a small amount of HCl, when premixed with the acetylene, dilutes the acetylene to substantially reduce the danger of explosion. Further, the cross-bleeding of some of the HCl provides an HCl-acetylene mixture for immediate reaction upon reaching the catalyst bed, thus further spreading the reaction throughout the bed length.

Referring now to FIGURE 12, a primary reactor tube 74 of my invention as shown in FIGURES 9 and 10 contains an appropriate catalyst and is supplied with reactants through conduits 76, 78 and through preheaters 80 and 82 respectively. Before the reactants are preheated, a portion of the reactant in conduit 76 is passed to conduit 78 by a cross-bleed line 84 to dilute the reactant in conduit 78 and to provide for immediate reaction when the premixed reactants arrive at the catalyst bed. To control the amount of premixing a valve 86 is provided in line 84. The valve 86 may be manually or automatically controlled in accordance with the temperature in the lower portion of the catalyst bed. For example, a thermocouple at point 88 may give visual temperature indication for manual control or the output of the thermocouple may be translated by automatic valve actuating means to control valve 86 in the manner well known in the art.

Still referring to FIGURE 12, another embodiment of the invention provides for two reactors in series to obviate problems encountered in the recycling of nonreacted gases. Thus, as shown in FIGURE 12, the product and unreacted gases exit from reactor 74 through conduit 90, are passed through compressor 92 and then to a stripping column 94 for further separation of the unreacted gases and the product, which is removed through line 96. The unreacted gases then pass through preheater 98 via conduit 100 and are then fed to the central reactant distributor 102 of a secondary reactor tube 104 of my invention. The product output of reactor 104 is then passed through a condenser 106 for final recovery of the product. Traces of unreacted gases may be vented to the atmosphere.

With the series reactor embodiment of the invention, the production rate of a product such as vinyl chloride monomer can be increased substantially since the unreacted mixed gases which are passed through the secondary reactor 104 may be at a much higher pressure than is possible if these gases were recycled. If these same gases are recycled and introduced into an initial reactant conduit 76 or 78, they would be introduced at a pressure only slightly greater than the pressure in the reactant conduit. I have found that the production of vinyl chloride monomer can be substantially increased. The increased pressure at which the unreacted gases can be passed through the secondary reactor permits higher input rates into the primary reactor tube. By the use of series reactors well over 90% yield is accomplished by the primary reactor and with the same percentage yield in the secondary reactor, a total yield of over 99% is provided.

*Example IV*

In practicing the invention illustrated in FIGURE 12 for the production of vinyl chloride monomer, the following is illustrative:

From .8 to 2.5 lbs. per hour of acetylene is passed through conduit 78 and from 1.2 to 3.5 lbs. per hour of hydrogen chloride is passed through conduit 76. The acetylene pressure may be from 2 to 15 p.s.i. with the hydrogen chloride pressure higher than the acetylene to effect the cross-bleed through conduit 84. Except for the partial premix in conduit 78 the reactants are introduced separately into the catalyst bed after being preheated to a temperature of from 200° to 300° F. As pointed out above, the amount of cross-bleeding of hydrogen chloride into the acetylene line may be determined by the temperature at point 88 at the beginning of the catalyst bed. This temperature should be kept in the range of 270° to 380° F.

As the vinyl chloride monomer and unreacted gases leave the primary reactor 74, they are further compressed at 92, pass through the stripping column 94 and are passed through preheater 98 before entry into the central distributor tube 102 of secondary reactor 104. The entry temperature of the mixed, unreacted gases should be in the range of 200° to 300° F. at a pressure of 25–30 p.s.i. Upon leaving the secondary reactor the produced vinyl chloride monomer is recovered at condenser 106 and the traces of unreacted gases are vented to the atmosphere. In both the primary and secondary reactor, the cooling fluid temperature should be between 150° to 270° F. upon entry into the reactor cooling jacket. The yield of vinyl chloride monomer is found to be nearly 100% and the rate of production substantially increased over prior art methods.

It should be understood that the examples of the production of vinyl chloride and vinyl acetate are illustrative only and that the apparatus and methods may be applicable to a great number of vapor phase catalytic reactions.

It will be understood, of course, by those skilled in the art that my invention is not limited only to the particular catalytic reactions mentioned hereinbefore and shown by way of illustration in the above illustrative examples. Other catalytic, vapor-phase, exothermic reactions to which the present invention is applicable are those described in the aforementioned Downs Patent No. 1,604,739 and in other prior art patents involving the use of reactors of the fixed-bed catalyst type and, more particularly, of the "shell-and-tube" type.

Still other modifications are within the scope of the invention. For instance, where a number of reactants are used, one or more of the gaseous reactants may be fed directly to the catalyst bed with one or more reactants being fed through the distributor tube. Also, one might have in operation a reactor of the kind shown in FIGURE 1, which could be used as a trap for volatilized catalyst, specifically mercuric chloride (the common catalyst used in the production of vinyl chloride), after which the flow would be reversed.

One of the unexpected results of the reactors and methods of my invention is a substantial reduction of the "hot spot" temperature with the same feed-gas rate per catalyst volume. Consequently, it is possible to increase the feed-gas rate until a substantially uniformly high temperature is obtained along the entire length of the catalyst bed. Since this temperature is, in general, lower than the "hot spot" temperature heretofore obtained, the life of the catalyst is increased and reactor-temperature control is made easier. Furthermore, since this lower temperature extends over a much greater length of the reactor, both the total rate of heat removal and the rate at which the reaction product, e.g., vinyl chloride is formed are greatly improved. The practical and commercial significance of these results will be immediately apparent to those skilled in the art.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Fixed-bed catalyst-tube reactor apparatus comprising, in combination
   (A) walls defining at least one substantially vertical catalyst bed-confining tube having outlet means at its upper end,
   (B) catalyst bed-supporting means spanning the lower end of the tube,
   (C) tube-supporting means positioning the upper end of the tube and the lower end of the tube and the bed-supporting means, and enclosing a cooling zone surrounding the walls of the tube,
   (D) and a tubular gas distributor extending upwardly through the bed-supporting means into the tube, with the distributor being perforated over a major portion of the vertical length of the tube,
   (E) with a first reactant gas inlet conduit opening into the distributor beneath the bed-supporting means, a second reactant gas inlet conduit opening into the catalyst bed-confining tube, and a cross-bleed conduit with an adjustable valve therein joining said first and second inlet conduits, whereby reactant gas passing through the first conduit may be continuously diluted by a predetermined percentage of reactant gas bled from the second conduit, providing immediate reaction when the premixed reactants are introduced into the catalyst bed, and producing spreading and dissipation of any heat produced by the exothermic reaction of the reactant gases in the catalyst bed.

2. The combination defined in claim 1 including automatic means governing the adjustable valve in response to temperature changes at the point where the premixed reactants are introduced into the catalyst bed.

3. Plural-stage fixed-bed catalyst-tube vapor phase reactor apparatus comprising, in combination
   (A) walls defining at least two substantially vertical catalyst bed-confining tubes each having outlet means at its upper end,
   (B) catalyst bed-supporting means spanning the lower end of each tube,
   (C) a separate tubular gas distributor extending upwardly through the bed-supporting means into each tube, with each distributor being perforated over a major portion of the vertical length of the tube,
   (D) stripping means for separating reaction product from the unreacted reactant gases with a stripping conduit connecting the outlet means of a first of said tubes to the stripping means, and a secondary conduit connected to carry the unreacted reactant gases from the stripping means to the distributor in a second of said tubes,
   (E) and a compressor interposed in the stripping conduit between the first of said tubes and the stripping means.

References Cited by the Examiner
UNITED STATES PATENTS

| | | | |
|---|---|---|---|
| 1,828,146 | 10/1931 | Joseph | 23—288 |
| 2,042,469 | 6/1936 | Joseph | 23—288 |
| 2,089,038 | 8/1937 | Pyzel | 23—288 |
| 2,315,208 | 3/1943 | Kinnaird | 23—288 |
| 2,518,583 | 8/1950 | Watson | 23—288 |
| 2,753,249 | 7/1956 | Identen et al. | 23—288 |
| 2,969,318 | 1/1961 | Woodall | 23—288 X |
| 3,010,807 | 11/1961 | Christensen et al. | 23—288 |

References Cited by the Applicant
UNITED STATES PATENTS

| | | |
|---|---|---|
| 1,685,759 | 9/1928 | Walter. |
| 2,329,795 | 9/1943 | Stanley. |
| 2,338,586 | 1/1944 | Keller. |
| 2,498,552 | 2/1950 | Kilgren et al. |
| 2,521,538 | 9/1950 | Rees. |
| 2,858,347 | 10/1958 | Hutchings. |

FOREIGN PATENTS

| | | |
|---|---|---|
| 581,573 | 10/1946 | Great Britain. |
| 488,723 | 12/1952 | Canada. |

OTHER REFERENCES

Hougen et al.: Chemical Process Principles, Part III, Kinetics and Catalysis, Wiley and Sons (New York, 1947), pp. 1031–2.

MORRIS O. WOLK, *Primary Examiner.*

J. SCOVRONEK, *Assistant Examiner.*